(12) United States Patent
Hüttl

(10) Patent No.: US 12,304,298 B2
(45) Date of Patent: May 20, 2025

(54) NEEDS-BASED COOLING OF A BEV

(71) Applicant: AUDI AG, Ingolstadt (DE)

(72) Inventor: Martin Hüttl, Abensberg (DE)

(73) Assignee: AUDI AG, Ingolstadt (DE)

( * ) Notice: Subject to any disclaimer, the term of this patent is extended or adjusted under 35 U.S.C. 154(b) by 210 days.

(21) Appl. No.: 18/348,080

(22) Filed: Jul. 6, 2023

(65) Prior Publication Data

US 2024/0010065 A1  Jan. 11, 2024

(30) Foreign Application Priority Data

Jul. 7, 2022 (DE) .............. 10 2022 116 936.7

(51) Int. Cl.
| | |
|---|---|
| B60K 11/02 | (2006.01) |
| B60L 50/60 | (2019.01) |
| F04B 49/20 | (2006.01) |
| H02P 29/68 | (2016.01) |

(52) U.S. Cl.
CPC .............. *B60K 11/02* (2013.01); *B60L 50/60* (2019.02); *H02P 29/68* (2016.02); *B60L 2240/425* (2013.01); *F04B 49/20* (2013.01)

(58) Field of Classification Search
CPC .... B60K 11/02; B60L 50/60; B60L 2240/425; B60L 2240/525; B60L 1/003; B60L 1/02; H02P 29/68; F04B 49/20; F04D 15/0066

USPC ........................................................ 62/259.2
See application file for complete search history.

(56) References Cited

U.S. PATENT DOCUMENTS

| | | | |
|---|---|---|---|
| 2009/0139686 A1 | 6/2009 | Suzuki | |
| 2017/0144532 A1* | 5/2017 | Tokozakura | ........... B60K 6/445 |
| 2017/0297431 A1* | 10/2017 | Epstein | ................... F02N 19/10 |
| 2019/0223330 A1* | 7/2019 | Chen | ................. H05K 7/20272 |

FOREIGN PATENT DOCUMENTS

| | | |
|---|---|---|
| DE | 102018209340 B3 | 4/2019 |
| DE | 102019124429 B4 | 3/2022 |
| EP | 1942038 A1 | 7/2008 |
| JP | 2008253098 A | 10/2008 |
| WO | WO 2017182226 A1 | 10/2017 |
| WO | WO 2021078456 A1 | 4/2021 |

OTHER PUBLICATIONS

Wikipedia, Temperatursensor, retrieved Jan. 10, 2024, from URL= https://de.wikipedia.org/w/index.php?title=Temperaturesensor &oldid...%201%20von. (3 pages).

* cited by examiner

*Primary Examiner* — Steve S Tanenbaum
(74) *Attorney, Agent, or Firm* — Seed IP Law Group LLP

(57) ABSTRACT

A system and a method for needs-based cooling of the power electronics and the E-machine of a battery electric powered motor vehicle.

10 Claims, 1 Drawing Sheet

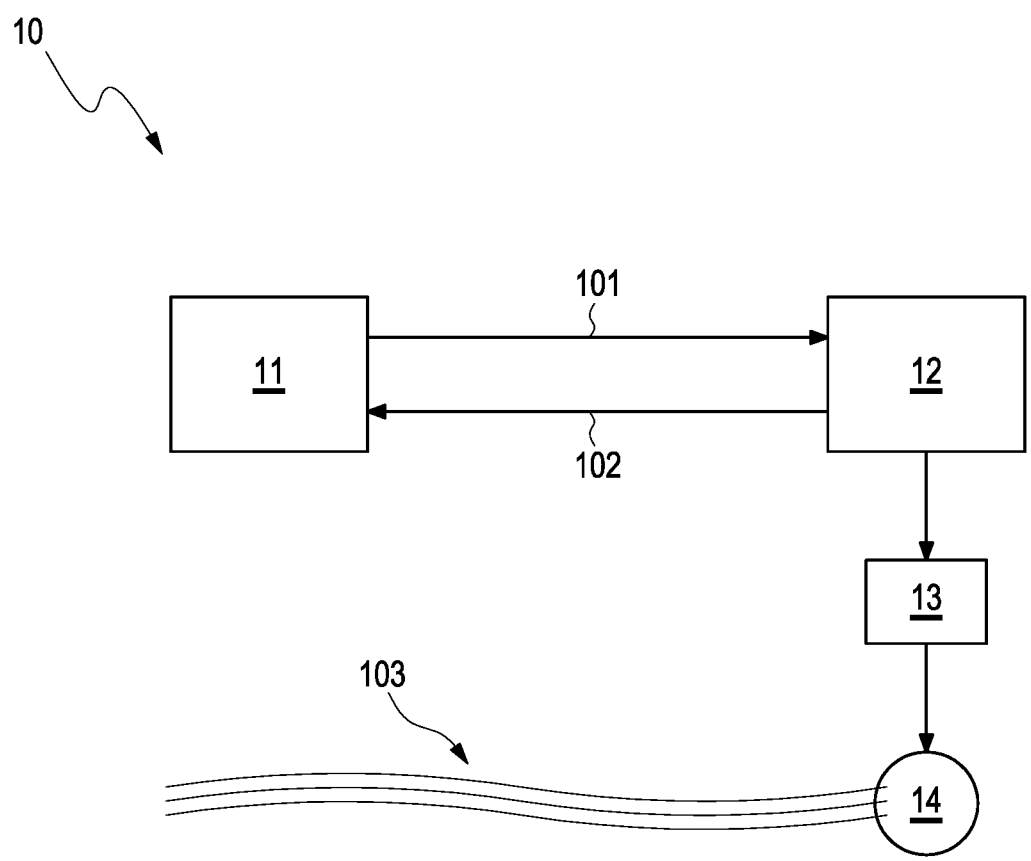

NEEDS-BASED COOLING OF A BEV

BACKGROUND

Technical Field

Embodiments of the present disclosure relate to a system and a method for needs-based cooling of the power electronics and the E-machine of a battery electric powered motor vehicle (BEV).

Description of the Related Art

For electric drives in vehicle applications, the cooling function of the components is generally realized with the aid of water cooling by a mixture of water and glycol. This mixture is delivered by a coolant pump with a given volume flow Q by cooling hoses through the components, which are hooked up both in series and in parallel.

When determining the required volume flow demands by the power electronics (=pulse inverter) and E-machine components, a fixed dependency on the current cooling water temperatures is generally assumed, and the necessary volume flow is regulated accordingly. This volume flow makes it possible to achieve full capability, since the maximum power loss occurring during operation can also be taken away. Thus, e.g., at a cooling water temperature of −30° C. a volume flow demand of 2 l/min can be assumed, at a cooling water temperature of 25° C. a volume flow demand of 5 l/min, and at a cooling water temperature of 70° C. a volume flow demand of 10 l/min. Due to the static dependency of the volume flow demand on the current water temperatures, it is not possible to deal with the actual cooling demand of the power electronics and electric machine components in operation. The cooling is performed constantly with values of the volume flow Q, which in most operating instances of the components are not required. The reason for this is that the volume flow demand is designed such that in every instance the potentially maximum capability can be provided.

The document JP 2008 253 098 A relates to a cooling system and a vehicle having the system. A controller generates a current instruction based on an output required for an AC motor based on the position of the gas pedal in the vehicle, and causes an inverter to match the actual motor current with the current instruction. The controller estimates a loss produced in the inverter based on the position of the gas pedal and configures a target flow rate Q* of cooling water to flow in the coolant pathways. The controller controls the speed of a water pump in order to circulate the cooling water with the configured target flow rate Q*.

The document US2017/144532 A1 discloses a cooling device for a hybrid vehicle having an oil circulation circuit, which supplies oil put out by an electric oil pump to a first motor, a second motor, an inverter, and a part having a lubrication demand. The oil circulation circuit comprises: a first circuit, which supplies the oil put out by the electric oil pump and cooled by a HV cooler to the inverter, the first motor and the second motor; and a second circuit, which supplies the oil put out by the electric oil pump, without being cooled by the HV cooler, to the part with lubrication demand. It is possible to regulate the oil flow rate of the first circuit and the second circuit by a flow rate control valve, in order to control the distribution of the oil flow rate between the first circuit and the second circuit in dependence on the vehicle condition, such as the load on the electric motors and the lubricating oil temperature.

There is known from the document EP 1 942 038 A1 a cooling system intended for a drive train, comprising a first drive system with a first heat-generating drive source and a second drive system with a second heat-generating drive source. The cooling system comprises: a circulation flow pathway, which is arranged to allow a coolant to flow into the first drive system; a second drive system flow pathway, which branches off from the circulation flow pathway and is arranged to bypass the first drive system and thereby allow the coolant to flow into the second drive system; a flow rate distribution regulator, which is configured to regulate a distribution ratio of a drive system of the coolant flowing into the first drive system and a drive system of the coolant flowing into the second drive system bypassing the first drive system; an electric pressure feeding device, which is configured to feed the coolant through the circulation flow pathway under pressure; a coolant temperature detector, which is configured to measure a temperature of the coolant; a first condition detector, which is configured to detect a driving condition of the first drive system; a second condition detector, which is configured to detect a driving condition of the second drive system; a flow rate demand setting module, which is configured to set a first flow rate demand required to cool down the first drive system, based on the measured temperature of the coolant and the detected driving condition of the first drive system, and set a second required flow rate demand in order to cool down the second drive system based on the measured temperature of the coolant and the detected driving condition of the second drive system; and a controller, which is configured to control the flow distribution regulator and the electric pressure feed so that the flow rate of the coolant flowing into the first drive system and the flow rate of the coolant flowing into the second drive system are set each time according to the first flow rate demand and the second flow rate demand.

BRIEF SUMMARY

Embodiments of the disclosure provide a device and a method with which the power demand of the water cooling of the drive of a battery electric powered motor vehicle (BEV) can be reduced and thus the range of the BEV can be increased.

Embodiments include a cooling system for a battery electric powered motor vehicle (BEV). A BEV in the sense of the present application is a motor vehicle powered exclusively by electric machines, having no additional internal combustion engine, and in which the electric machines are energized by at least one accumulator of electric energy, which is generally designed as a high voltage (HV) battery.

The cooling system comprises a coolant circuit having a coolant pump, at least one drive unit connected to the coolant circuit, comprising a pulse inverter (PWR) and at least one electric machine (EM), and a coolant pump controller. The cooling system furthermore has a device or means of measuring a current temperature of power electronic components of the at least one drive unit, a device or means of measuring a current coolant temperature in the at least one drive unit, and a device or means of determining a present power loss of the at least one drive unit, as well as a device or means of calculating a target volume flow of a coolant in the cooling system. The coolant pump controller is adapted to regulate a delivery performance of the coolant pump so that the flow rate of the coolant flow in the cooling system corresponds to the calculated target volume flow.

In one embodiment, the cooling system also comprises a device or means of measuring a current coolant volume flow in the cooling system. In one embodiment, the device or means of measuring a current coolant volume flow in the cooling system comprises at least one flow meter. In another embodiment, the flow meter is a magnetically inductive (MID) flow meter. In other embodiments, the flow meter is a suspended particle flow meter or an ultrasound flow meter (USD). In still other embodiments, the flow meter is an impeller counter, a helical counter, a turbine-wheel flow meter, or a Woltmann counter.

The cooling system comprises a device or means of measuring a current temperature of power electronic components of the at least one drive unit. In one embodiment, the device or means of measuring a current temperature of power electronic components of the at least one drive unit comprises at least one temperature sensor. In another embodiment, the at least one temperature sensor comprises semiconductor temperature sensors (solid state circuits) integrated in the power electronic components.

The cooling system comprises a device or means of measuring a current coolant temperature in the at least one drive unit. In one embodiment, the device or means of measuring a current coolant temperature in the at least one drive unit comprises at least one temperature sensor. In another embodiment, the at least one temperature sensor comprises a negative temperature coefficient (NTC) thermistor or a positive temperature coefficient (PTC) thermistor. In another embodiment, the at least one temperature sensor comprises a temperature probe with oscillating quartz as the measuring element. The resonance frequency of the oscillating quartz varies depending on the temperature and can be measured precisely. In yet another embodiment, the at least one temperature sensor comprises a thermoelement which converts a temperature difference by the Seebeck effect into an electric voltage. In yet another embodiment, the at least one temperature sensor comprises a fiber optic temperature sensor, which measures the temperature profile along a glass fiber based on the Raman effect or the temperature-dependent change in the refractive index in fiber Bragg lattice sensors (FBGS).

Embodiments also include a method for needs-based cooling of at least one drive unit of a BEV, such as a method for cooling at least one drive unit of a BEV which is connected to a coolant circuit having a coolant pump, the drive unit comprising a pulse inverter and at least one electric machine.

In one embodiment of the method, a target volume flow of a coolant in the cooling system is calculated as a function of a current temperature of power electronic components of the at least one drive unit, a current coolant temperature in the at least one drive unit, and a current power loss of the at least one drive unit and the delivery performance of the coolant pump is regulated so that a current volume flow of the coolant in the cooling system corresponds to the calculated target volume flow.

The power electronics and the electric machine independent determine their current cooling demand during operation, so that a needs-based volume flow is presented. For this purpose, a target volume flow of the cooling circuit is determined on the part of the components in dependence on the currently determined power loss, as well as the currently prevailing temperatures of the components and of the coolant. The target volume flow or the flow rate in one embodiment is determined as a function f (power loss of pulse inverter, current water temperature, current component temperatures). If the losses are low, i.e., there is a low cooling demand, the volume flow can be reduced. When higher power is demanded on the part of the components, the volume flow can be dynamically increased accordingly.

In one embodiment of the method, a current volume flow of the coolant in the cooling system is measured and checked to see whether the current volume flow corresponds to the target volume flow. In another embodiment, the actual value of the volume flows is fed back to the PWR and a comparison is made between the target volume flow and the current volume flow, in order to identify whether the target value has also been attained. If there is a deviation between actual value and target value, the delivery performance of the coolant pump can then be adapted accordingly until the target value is reached.

Thanks to the needs-based cooling function of power electronics and E-machine through setting a volume flow target, the power demand for the water cooling of the electric drive can be reduced. In general, all of the components involved, such as the coolant pumps and switching valves, are energized through a low-voltage power network, so that with reduced volume flow Q the power demand for the coolant pump also decreases. This, in turn, results in larger electric vehicle travel range thanks to higher overall vehicle efficiency, since for most operating situations a reduced volume flow can be selected, which leads to less power uptake by the coolant pump. The operating situations correspond to torque demands for the power electronics and E-machine as defined by the driver's desired torque, which in turn are derived from the current value of the gas pedal. Further benefits and embodiments of the disclosure will emerge from the description and the accompanying drawing.

The features mentioned above can be used not only in the particular indicated combination, but also in other combinations or standing alone.

BRIEF DESCRIPTION OF THE SEVERAL VIEWS OF THE DRAWINGS

The disclosure is represented schematically with the aid of the drawing and shall be further described making reference to the drawing.

FIG. 1 shows a schematic representation of one embodiment of the cooling system.

DETAILED DESCRIPTION

FIG. 1 is a schematic representation of one embodiment of the cooling system 10. There is shown a cooled drive unit 11, comprising a pulse inverter and at least one electric machine, as well as a device or means of measuring a current temperature of power electronic components of the drive unit 11, a device or means of measuring a current coolant temperature in the drive unit 11, and a device or means of determining a present power loss of the drive unit 11, as well as a device or means of calculating a target coolant volume flow 101. A cooling controller 12 is adapted to receive a value 101 for the target coolant volume flow in the cooling system 10 and to control via a driver 13 the rotational speed of a coolant pump 14 in order to regulate the flow rate Q of a coolant flow 103 in the cooling system 10, which cools the components of the drive unit 11. The cooling controller 12 is also adapted to measure a current coolant volume flow 102 in the cooling system 10 and send the measured value to the drive unit 11.

German patent application no. 10 2022 116936.7, filed Jul. 7, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A cooling system for a battery electric powered motor vehicle, comprising:
   a coolant circuit having a coolant pump;
   at least one drive unit connected to the coolant circuit, wherein the at least one drive unit includes a pulse inverter and at least one electric machine; and
   a coolant pump controller which is adapted to measure a current temperature of power electronic components of the at least one drive unit, measure a current coolant temperature in the at least one drive unit, determine a present power loss of the at least one drive unit, and calculate a target volume flow of a coolant in the cooling system, wherein the coolant pump controller is further adapted to regulate a delivery performance of the coolant pump so that the flow rate of the coolant flow in the cooling system corresponds to the calculated target volume flow.

2. The cooling system according to claim 1, wherein the coolant pump controller is adapted to measure the current temperature of power electronic components of the at least one drive unit via at least one temperature sensor.

3. The cooling system according to claim 2, wherein the at least one temperature sensor comprises semiconductor temperature sensors integrated in the power electronic components.

4. The cooling system according to claim 1, wherein the coolant pump controller is adapted to measure the current coolant temperature in the at least one drive unit via at least one temperature sensor.

5. The cooling system according to claim 4, wherein the at least one temperature sensor comprises a negative temperature coefficient thermistor or a positive temperature coefficient thermistor.

6. The cooling system according to claim 1, wherein the coolant pump controller is further adapted to measure a current coolant volume flow in the cooling system.

7. The cooling system according to claim 6, wherein the coolant pump controller is adapted to measure the current coolant volume flow in the cooling system via at least one flow meter.

8. The cooling system according to claim 7, wherein the flow meter is a magnetically inductive flow meter.

9. A method for cooling at least one drive unit of a battery electric powered motor vehicle which is connected to a coolant circuit having a coolant pump of a cooling system, the drive unit comprising a pulse inverter and at least one electric machine, the method comprising:
   calculating a target volume flow of a coolant in the cooling system as a function of a current temperature of power electronic components of the at least one drive unit, a current coolant temperature in the at least one drive unit, and a current power loss of the at least one drive unit; and
   regulating the delivery performance of the coolant pump so that a current volume flow of the coolant in the cooling system corresponds to the calculated target volume flow.

10. The method according to claim 9, further comprising: measuring and checking a current volume flow of the coolant in the cooling system to see whether the current volume flow corresponds to the target volume flow.

* * * * *